July 7, 1925.  1,544,889
J. G. COGLE
MACHINE FOR SPLITTING PICKLES
Filed July 12, 1924   4 Sheets-Sheet 1

Inventor
JAMES G. COGLE
By Ch. Parker
Attorney

July 7, 1925.
J. G. COGLE
1,544,889
MACHINE FOR SPLITTING PICKLES
Filed July 12, 1924   4 Sheets-Sheet 2
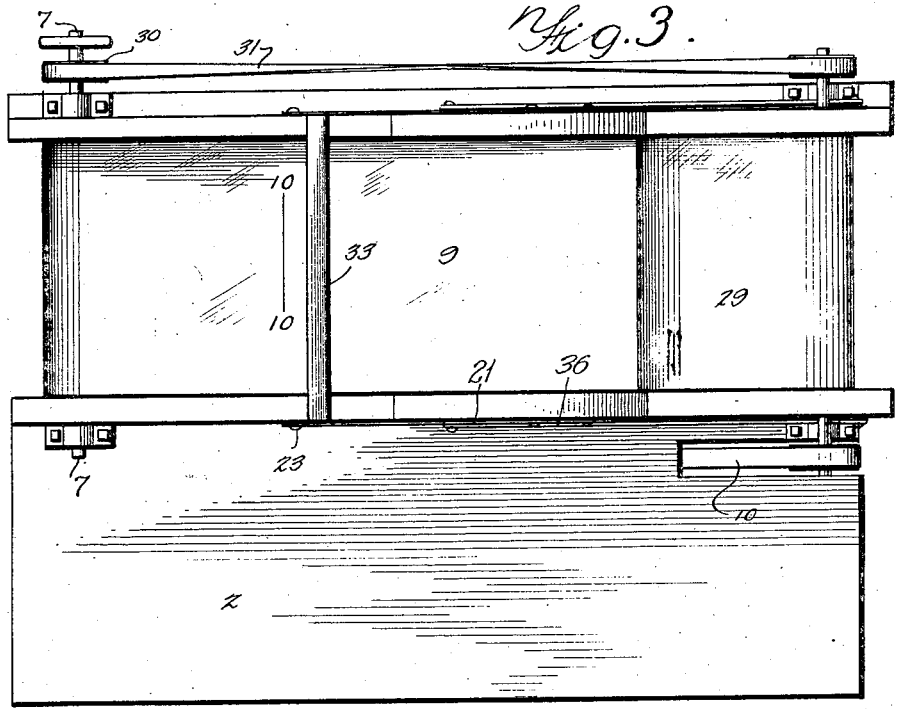
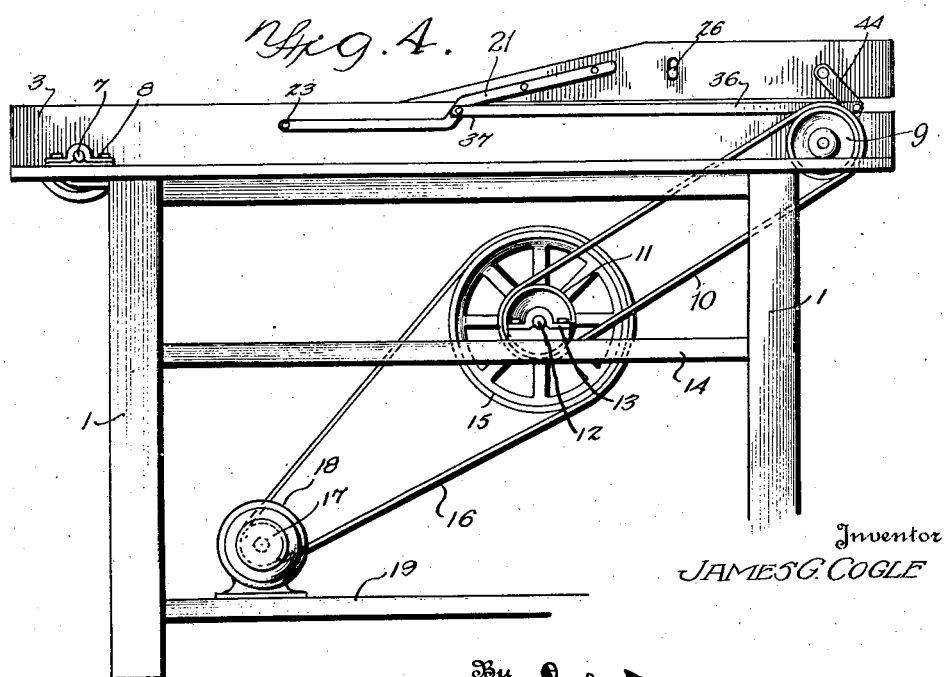
Inventor
JAMES G. COGLE
By C. H. Parker
Attorney July 7, 1925.

J. G. COGLE

MACHINE FOR SPLITTING PICKLES

Filed July 12, 1924. 4 Sheets-Sheet 3

1,544,889

Inventor
JAMES G. COGLE

Attorney

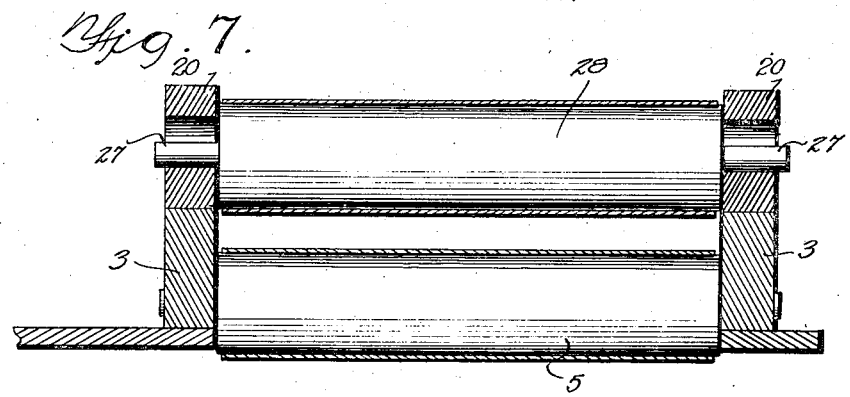
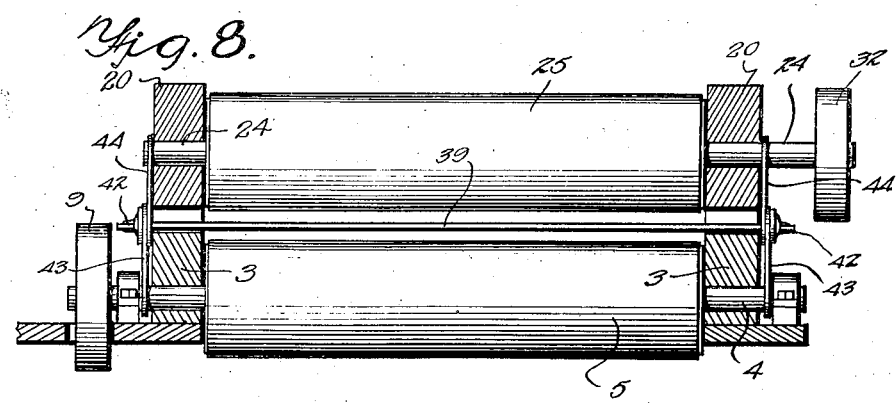
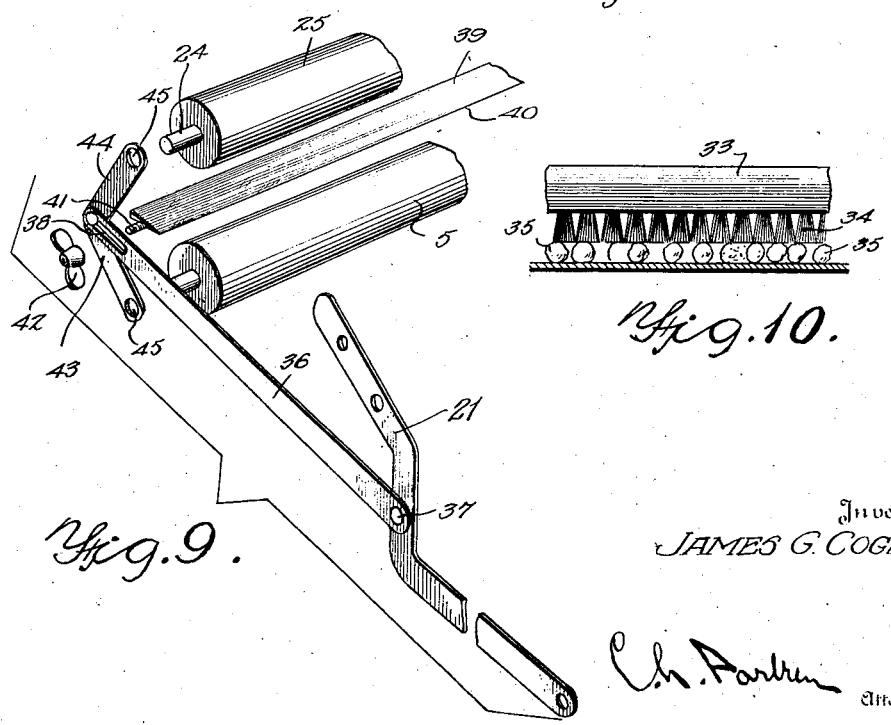

Patented July 7, 1925.

1,544,889

UNITED STATES PATENT OFFICE.

JAMES G. COGLE, OF RICHMOND, VIRGINIA, ASSIGNOR TO MRS. E. G. KIDD, INC., OF RICHMOND, VIRGINIA, A CORPORATION OF VIRGINIA.

MACHINE FOR SPLITTING PICKLES.

Application filed July 12, 1924. Serial No. 725,680.

*To all whom it may concern:*

Be it known that I, JAMES G. COGLE, a citizen of the United States, residing at Richmond, in the city of Richmond and State of Virginia, have invented certain new and useful Improvements in Machines for Splitting Pickles, of which the following is a specification.

This invention relates to machines for splitting pickles.

An object of the invention is the provision of means for splitting pickles lengthwise in preparing them for the market.

A further object of the invention is to provide a machine for splitting pickles in which the cutting element is automatically adjusted for pickles of different sizes.

A further object of the invention is the provision of a machine in which the feeding mechanism is automatically adjusted for pickles of different sizes.

More specifically, the invention comprises a pair of conveyors superposed upon each other and traveling in opposite directions whereby the upper flight of the lower conveyor and the lower flight of the upper conveyor will be traveling in the same direction. The conveyors are spaced from each other a distance such that the pickles will be retained between the two adjacent flights when passing the knife or cutting element and the upper conveyor is pivotally mounted to adjust itself to pickles of different thicknesses.

In the accompanying drawings, I have shown one embodiment of the invention. In this showing:

Figure 3 is a plan view,

Figure 4 is a side elevation taken from the side opposite to Figure 1,

Figure 1:
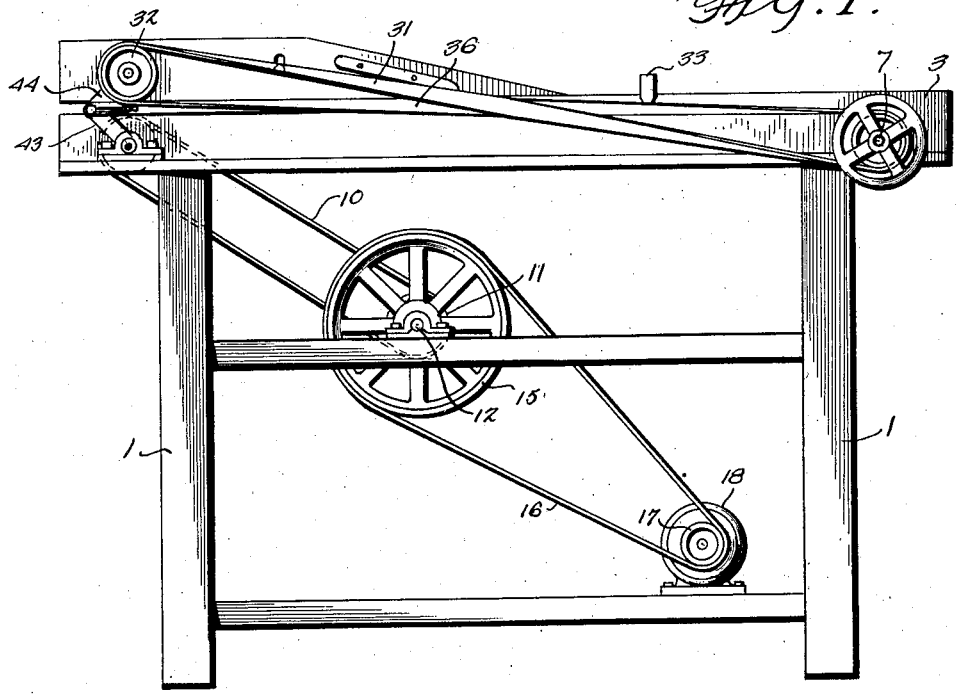
Figure 1 is a side elevation.
Figure 6:
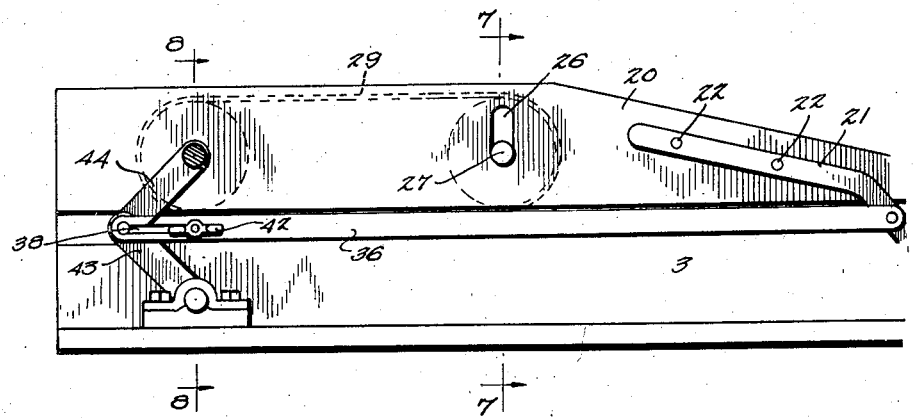

Figure 6 is an enlarged side elevation similar to Figure 1, showing the supporting mechanism of the upper conveyor and the cutting element, Figure 7 is a vertical sectional view on line 7—7 of Figure 6, Figure 8 is a similar view on line 8—8 of Figure 6, Figure 9 is a detail view of a portion of the upper conveyor supporting mechanism and the cutting element, and, Figure 10 is a detail sectional view through the lower conveyor and a brush arranged near the inlet substantially on line 10—10 of Figure 3.

Figure 5:
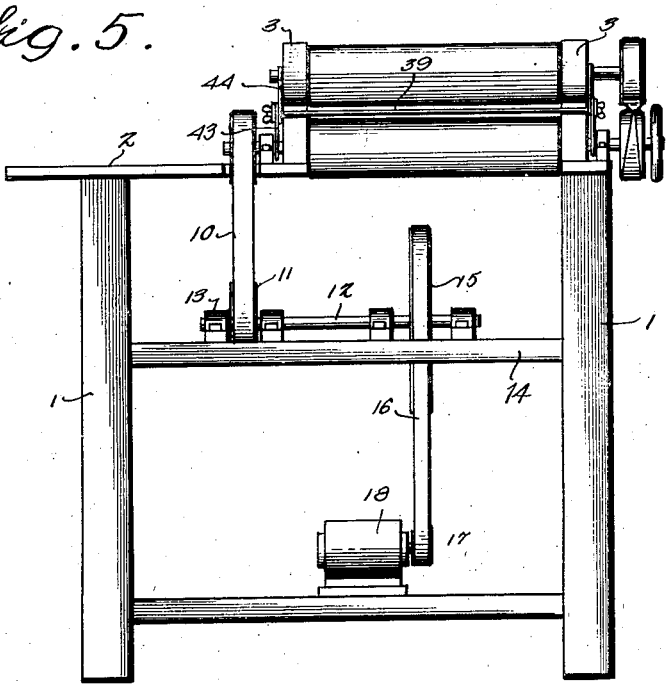
Figure 5 is an end elevation.

Referring to the drawings, the reference numeral 1 designates suitable legs upon, which the parts of the apparatus are mounted. A top or table 2 extends partially across the top of the legs and the conveying mechanism is arranged at one side, as shown in Figures 1 and 5. The conveyors are arranged between a pair of longitudinal supports 3, which are secured to the top of the table and are stationary. At the rear of the machine, a shaft 4 is journaled in these supports and this shaft carries a roller 5, extending substantially the entire distance between the supports. A similar roller 6 is arranged at the front end of the machine and each end of this roller is provided with stub shafts 7, received in suitable bearings 8, carried by the supports. An endless belt 9 passes over the rollers 5 and 6. The shaft 4 is provided with a drive pulley 9 adapted to receive a belt 10 passing over a pulley 11 on a shaft 12. The shaft 12 is mounted in bearings 13 carried by supporting members 14, extending longitudinally between the front and rear legs. This shaft carries a second pulley 15 adapted to receive a belt 16 passing over a pulley 17, arranged on the shaft of a motor 18. The motor is mounted on a suitable support 19 arranged above the floor or foundation and secured to the legs.

Figure 2:
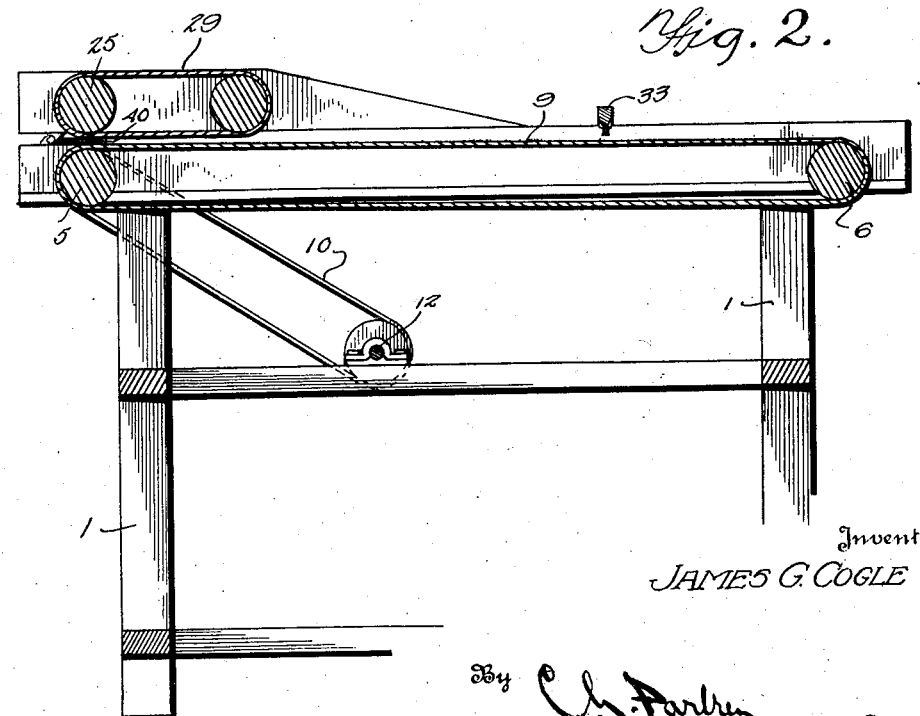
Figure 2 is a central longitudinal sectional view.

A second conveyor (see Figure 2) is arranged over the first lower conveyor and is adapted to travel in the opposite direction whereby the lower flight of the upper conveyor and the upper flight of the lower conveyor will travel in the same direction. As shown, the upper conveyor is mounted in a pivoted frame. This frame consists of a pair of side members 20 and bars 21 are rigidly secured thereto, as at 22. These bars are pivoted to the main frame at 23, so that the pivoted frame swings about the point 23 as an axis. A shaft 24 is arranged in the upper frame adjacent its rear end and this shaft carries a roller 25 extending substantially the entire distance between the side members 20. Forwardly of the shaft 24, the side members are provided with vertical slots 26, adapted to receive stub-shafts 27, formed on the ends of a roller 28. An endless belt 29 passes over the rollers 25 and 28. One of the stub shafts 7 extends beyond the bar 8 and is provided with a pulley 30, adapted to receive a drive belt 31. This belt passes over a pulley 32 on the shaft 24 to drive the upper conveyor and, as shown, (see Figures 1 and 3), the belt is crossed to drive the upper conveyor in the opposite direction from the lower conveyor. A brush 33 is mounted over the lower conveyor adjacent the inlet end of the machine and this brush is provided with bristles 34, which are spaced from the conveyor a slight distance (see Figure 10) and are adapted to engage the pickles 35 as they pass under it.

The cutting mechanism is shown in detail in Figure 9 of the drawings. As shown, a bar 36 is connected to each of the bars 21 intermediate their ends and the bars 36 extend rearwardly to a point adjacent the rear rolls of the two conveyors. As the bars 21 are pivotally mounted, the distance from the point 37 where the bars 36 are connected to the rear rolls will vary as the upper frame swings on its pivot and the rear ends of the bars 36 are thus provided with longitudinally extending slots 38. The cutting element is arranged in substantially the same vertical plane as the rear rollers 5 and 25 and consists of a bar 39 extending transversely of the machine and having a knife edge 40. The ends of the cutting element are circular in cross section and are threaded, as shown at 41, and these ends are adapted to be received in the slots 38. Thumb nuts 42 are arranged on the threaded ends to retain the cutting element in position. Suitable means are provided to retain the cutting element an equal distance from the rollers 5 and 25. Links 43 and 44 are arranged on the shafts 4 and 24, respectively, the links being provided with suitable openings 45 through which these shafts pass. The opposite ends of the links are received on the threaded portions 41, formed on the ends of the cutting elements.

The operation of the device is as follows:

The pickles to be slit are placed on the upper side of the conveyor 9 at the inlet end of the machine, in front of the brush 33. This brush serves to distribute the pickles evenly over the conveyor and prevent more than a single layer of pickles to pass between the conveyor belts at the delivery end of the machine. As the pickles pass between the two conveyors, the side frames 20 of the upper conveyor will be moved upwardly to an extent depending upon the size of the largest pickle passing through at any given time. When the thickness of a pickle is greater than the distance between the adjacent flights of the two conveyors, the upper conveyor is moved around the point 23 as an axis to increase the distance and permit the largest pickle to pass through the machine. The movement of the upper conveyor also adjusts the cutting element to compensate for the difference in the thickness of the pickles and retain the cutting element at a point equidistant from the rollers 5 and 25. The movement of the pivoted support bars 21 exercises a pull on the longitudinal bars 36 causing the links 43 and 44 to move forwardly and tend to assume a vertical position. This moves the cutting element 40 upwardly substantially half the distance that the upper roller 25 moves. The pickles passing between the conveyor belts are forced to pass the slitting knife 40 by the weight of the upper frame-work resting on them. If two pickles of different size strike the slitting knife at the same time, the largest pickle is carried through. As the smaller pickle is not positively driven beyond the slitting knife, it will remain stationary until the upper conveyor or belt engages it after the larger pickle has passed the knife. The weight of the upper conveyor resting on the pickle in front of the knife will then carry it past the knife and the pickle will be split.

The automatic adjustment of the upper conveyor and the cutting element permits the use of the machines with pickles as they are usually obtained of varying sizes and thickness and permits the splitting operation to be performed by machine with success, whereas heretofore the operation has been manually performed and a larger amount of time consumed.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. A pickle splitting machine comprising a conveyor, a splitting knife arranged above said conveyor and extending transversely thereof, a pivoted member arranged above said conveyor and adapted to engage the pickle to force it by said knife, and connections between said pivoted member and said knife to adjust the position of said knife when said conveyor swings on its pivot.

2. A pickle splitting machine comprising a conveyor, a splitting knife arranged above said conveyor and extending transversely thereof, a frame pivoted on said conveyor and arranged above said conveyor, a member carried by said frame and adapted to engage the pickle to force it by said knife, rods connected to said frame to support said knife, and links connected to said conveyor and said member and to said rods.

3. A pickle splitting machine comprising a conveyor, a splitting knife arranged above said conveyor and arranged transversely thereof, a second conveyor pivotally mounted over said first conveyor adjacent said splitting knife and adapted to engage the upper surface of a pickle on said conveyor to deliver it to said knife, and connections between said upper conveyor and said knife to adjust the position of said knife when said second conveyor swings on its pivot.

4. A pickle splitting machine comprising a conveyor, a splitting knife arranged above said conveyor and extending transversely thereof, an upper conveyor frame pivoted on said conveyor, a conveyor mounted in said upper frame and arranged above said first conveyor to engage pickles thereon and deliver them to said knife, rods connected to said upper conveyor frame and supporting said knife, and links connected to said upper and lower conveyors and to said rods.

5. A device constructed in accordance with claim 4 wherein means are provided for distributing pickles on said lower conveyor.

6. A device constructed in accordance with claim 4 wherein a brush is arranged over said lower conveyor to engage pickles thereon and distribute them on said lower conveyor.

In testimony whereof, I affix my signature in presence of two witnesses.

JAMES G. COGLE.

Witnesses:
R. A. CARTER,
H. A. McCURDY.